C. W. FRANKLIN.
BEET TOPPING MACHINE.
APPLICATION FILED JUNE 19, 1911.
1,025,693.
Patented May 7, 1912.
2 SHEETS—SHEET 1.
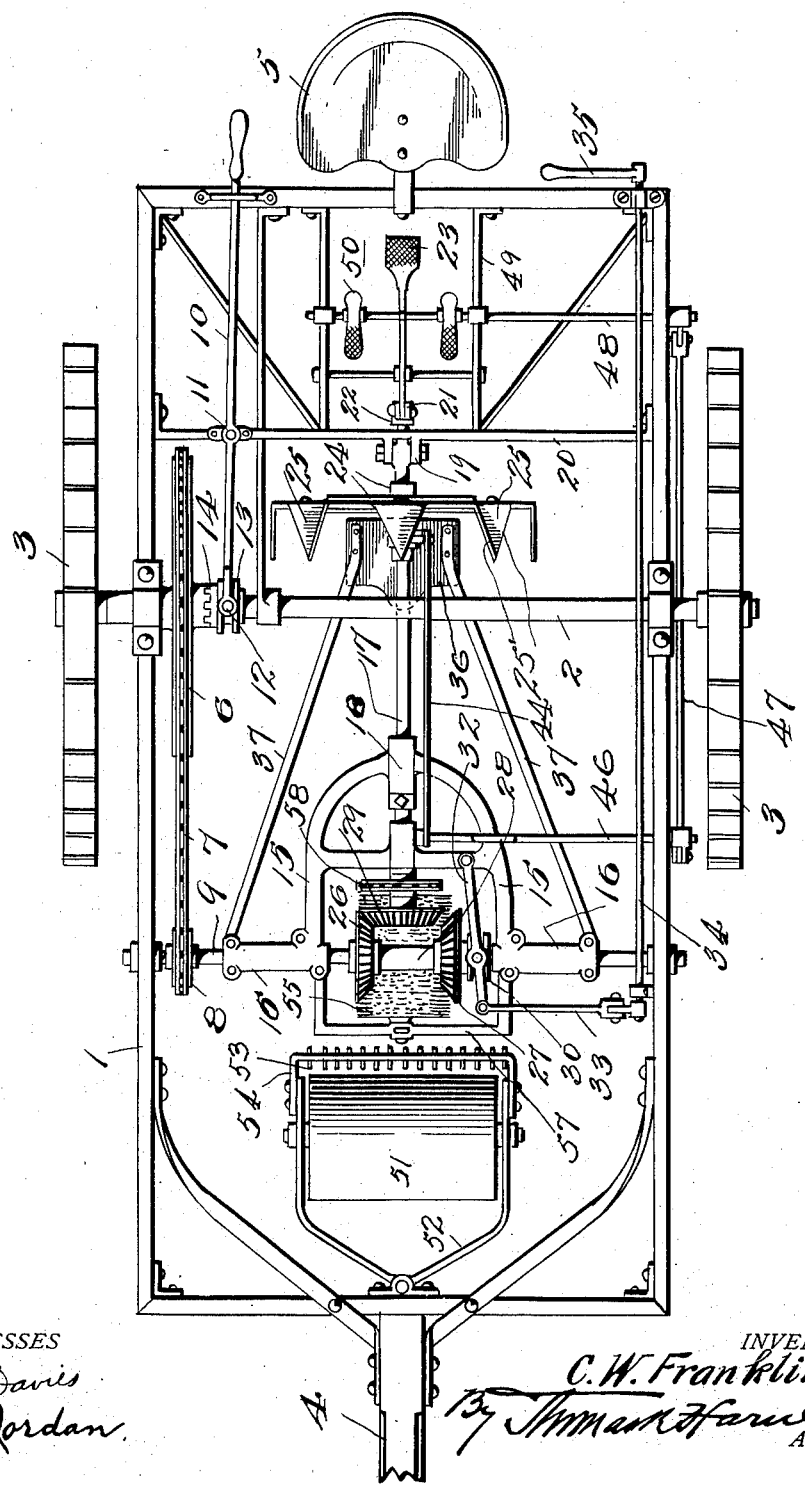
WITNESSES
C. K. Davis
E. A. Jordan
INVENTOR
C. W. Franklin
By Thmark Harne
Attorney

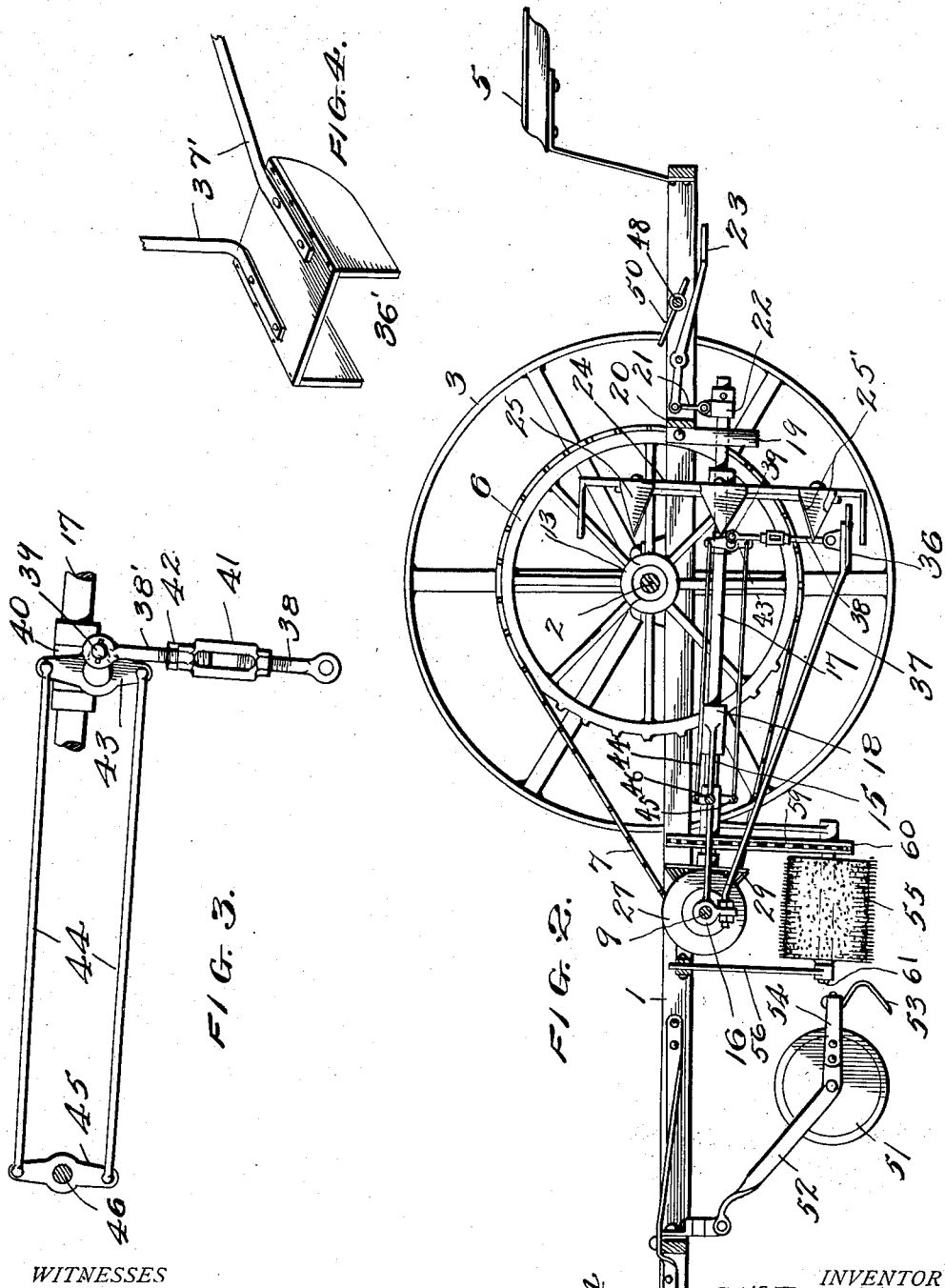

UNITED STATES PATENT OFFICE.

CHARLES W. FRANKLIN, OF LEIPSIC, OHIO.

BEET-TOPPING MACHINE.

1,025,693.  Specification of Letters Patent.  Patented May 7, 1912.

Application filed June 19, 1911. Serial No. 633,910.

*To all whom it may concern:*

Be it known that I, CHARLES W. FRANKLIN, a citizen of the United States, residing at Leipsic, in the county of Putnam and State of Ohio, have invented certain new and useful Improvements in Beet-Topping Machines, of which the following is a specification.

My invention relates to improvements in that class of agricultural implements known as beet-topping machines, and is designed especially with a view to providing an implement for cutting the tops from growing beets or other similar vegetables and plants.

The essential objects of the invention are to improve certain features of machines of this type whereby the operation of the machine is kept under direct control of the operator; the cut of the knives may be gaged to respond, and adapt the knives, to irregularities in the height of the succeeding beets, thus saving portions of the tops of the beets which would otherwise be wasted; and other objects and advantages will appear hereinafter.

The invention consists in certain novel combinations and arrangements of parts as hereinafter specified in the following claims.

In the accompanying drawings I have illustrated one complete example, and a modification thereof, of the physical embodiment of my invention, constructed according to the best mode I have so far devised for the practical application of the principles.

Figure 1 is a plan view of an implement embodying the novel features of the invention. Fig. 2 is a vertical sectional view of Fig. 1. Fig. 3 is an enlarged detail of an eccentric knife gage, and Fig. 4 is a modified form of knife support, adapting the implement for use as a cotton chopper, or the like.

In general, the implement is somewhat similar to the standard sulky-cultivator comprising the rectangular frame 1, the axle 2, and traction wheels 3, and is adapted to be drawn by horse power attached to the tongue 4, a seat 5 being provided at the rear of the frame for the operator.

The operating mechanism is actuated from the driving axle 2 by means of the large sprocket wheel 6, chain 7, small sprocket 8, and the transverse countershaft 9, and this actuating mechanism is thrown into and out of action by means of the clutch lever 10, which is pivoted at 11 to the frame, and whose yoke 12 is engaged in the collar 13. It will of course be understood that the large sprocket 6 is loose on the axle 2, and is rotated only when the teeth 14 of the clutch members are engaged, as shown in Fig. 1.

The operating mechanism which constitutes the beet-topping device is suspended on the countershaft 9 by means of the bracket 15 which is formed with tubular bearings or sleeves 16, incasing the shaft and rotatable thereon. The driven shaft 17, of the topping mechanism is also supported in bracket 15 by means of the sleeves or bearings 18, and the bracket 15 and supported shaft 17 are free to be moved vertically upon the shaft 9 as a pivot. The rear or free end of the shaft 17 is suspended between the guide plates 19 formed as a part of the cross bar 20, by means of the link 21, and collar 22, and the pivoted foot lever 23, is utilized for raising, or permitting the lowering, of the shaft 17 between its guide plates 19. Secured upon and rotatable with the shaft 17 is a knife-carrying disk 24, upon which the cutters or knives 25 are secured. These knives are formed with double edges, as 25' so that the beet tops may be severed by the movement of the rotatable disk and knives in either direction, as provided for by means later described. The shaft 17 is operated from the counter shaft 9 by either of the two bevel pinions 26, 27, carried on the slidable sleeve 28, which is rotatable with the shaft 9. Either of these two pinions is adapted to drive the complementary pinion 29 on shaft 17, and thus rotate the shaft.

For providing a right-hand, or left hand action, of the cutting knives, the sleeve 28 and gears 26 and 27 may be moved by means of the shifting spool 30 and lever arm 32, which latter is connected by draw rod 33 with the rocker arm 34, provided with the turning handle 35. By turning the handle 35 the bevel pinions are shifted so that one or the other is made to mesh with the pinion 29 thus driving the shaft 17 in selected direction and rotating the knives 25 so that the beet tops are cut and thrown out in the proper direction with relation to the row of plants.

In connection with the cutting knives I employ a gaging mechanism, by means of which the height of the cut may be determined, as the rotating knives sever the beet tops. The gaging shoes or drag 36 is suspended from the sleeves of the bracket 15 by means of brace rods 37, and the shoe is further supported by means of the bolts 38, 38' which are attached respectively to the shoe and to a crank or eccentric arm 39 rotatable in a block 40 loosely and non-rotatably supported on the shaft 17.

The height of the shoe may be predetermined and adjusted by means of the turn buckle 41 and lock nut 42, and held in this permanent relationship. But a further adjustment of the parts is provided for by means of the eccentric or cranks 39. To this end I utilize the crank plate 43 which is secured on the eccentric arm 39 and connected by draw rods 44 to a second plate or arm 45 secured on the rock shaft 46. The rock shaft 46 may be rocked by means of the draw bar 47 and the second rock shaft or pedal bar 48, the latter being journaled in the frame bars 49. Foot pieces 50 are provided by means of which the operator as he sits in the seat 5, can continuously regulate the height of the shoe with relation to the rotating knives therebeneath.

In connection with the beet-topping mechanism, I also combine a roller 51, which is located toward the front of the implement and supported from the frame by the hanging rods 52. A rake 53 is also attached by means of the yoke 54 to the rods or bars 52 of the roller 51.

Located between the rake and the cutting knives is a sweeper or brush 55, which is suspended by hangers 56 from the bracket 15 and supplemental bracket 57. This brush or sweeper is actuated from the shaft 17 by means of the sprocket wheel 58, chain 59 and the wheel 60 located on the axle 61 of the brush.

In Fig. 4 of the drawings I have illustrated a sled 36' to be substituted for the shoe 36, and supported by means of the brace rods 37'. This sled is to be used when it is desired to use the implement without "riding down" the beet or other vegetable tops.

In operation as the implement is propelled forwardly, the roller 51 "rides down" the tops of the beets, and the following rake rakes the leaves and stalks in one direction. The rotating sweeper or brush then cleans the row and brushes the tops of the plant either to the right or the left depending upon the travel of the implement, and the sliding plate or shoe 36 automatically rises or falls, lifting or lowering the knife disk and knives, as it encounters irregularities in the height of the beets. By this automatic movement of the knives they are adjusted to the required height for each individual vegetable, and a uniform slice or cut is made from each beet.

It will be understood that the operator at all times controls the movement of the cutting device by the movement of his feet upon the foot pieces 50. The rotation of the cutting knives may be reversed, as described, to cut and throw the beet tops to either side of the row.

Having thus fully described my invention, what I claim as new and desire to secure by Letters Patent is:—

1. The combination in an implement as described of supporting wheels and a frame, with a roller and a rake connected at the front of the frame, a transversely rotatable brush at the rear of said rake, an adjustable supporting frame and cutting knives supported on said adjustable frame.

2. The combination in an implement as described of supporting wheels and a frame, a roller, a rake, and a transversely rotatable brush, of an adjustably supported pivoted frame, and a rotatable knife supported and actuated in said frame.

3. The combination with a frame, supporting wheels and axle, of a countershaft actuated from the axle, a frame pivoted on said countershaft and provided with a depending supporting plate, a shaft supported in the pivoted frame and driven from the countershaft, a rotary knife on said shaft, means for adjusting the height of said knife and means for adjusting the vertical position of the supporting plate with relation to said knife.

4. The combination with a frame, wheels and axle and a countershaft actuated therefrom, a frame pivoted on the countershaft and provided with a depending supporting plate, a shaft supported in the pivoted frame and carrying a rotary knife, a bearing sleeve supporting said shaft and lever mechanism for suspending said sleeve, and eccentric means for adjusting the height of the supporting plate.

5. The combination in an implement as described, of a pivoted frame, a driven shaft and a rotatable knife, with a sliding support connected to said shaft, and eccentrically operated means for adjusting the height of said support relative to the knife.

6. The combination in an implement as described of a pivoted frame, a driven shaft and a rotatable knife, of a sliding shoe connected to support said shaft, eccentric means for adjusting the height of the shoe with relation to the knife, and means for adjusting the height of the pivoted frame.

In testimony whereof I affix my signature in presence of two witnesses.

CHARLES W. FRANKLIN.

Witnesses:
A. A. SLAYBAUGH,
EMILY SLAYBAUGH.